US010328956B2

(12) United States Patent
Kleitsch et al.

(10) Patent No.: US 10,328,956 B2
(45) Date of Patent: Jun. 25, 2019

(54) LATERAL GLAZING FOR MEANS OF TRANSPORT WITH OPENABLE WINDOW

(71) Applicant: SAINT-GOBAIN GLASS FRANCE, Courbevoie (FR)

(72) Inventors: Michael Kleitsch, Köln (DE); Uwe Grigo, Köln (DE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 143 days.

(21) Appl. No.: 15/511,535

(22) PCT Filed: Sep. 17, 2015

(86) PCT No.: PCT/FR2015/052491
§ 371 (c)(1),
(2) Date: Mar. 15, 2017

(87) PCT Pub. No.: WO2016/042270
PCT Pub. Date: Mar. 24, 2016

(65) Prior Publication Data
US 2017/0282938 A1   Oct. 5, 2017

(30) Foreign Application Priority Data
Sep. 19, 2014 (FR) .................................... 14 58870

(51) Int. Cl.
*B61D 25/00* (2006.01)
*B32B 17/10* (2006.01)
(Continued)

(52) U.S. Cl.
CPC ........ *B61D 25/00* (2013.01); *B32B 17/10055* (2013.01); *B32B 17/10073* (2013.01);
(Continued)

(58) Field of Classification Search
CPC .............. B62D 25/00; B32B 17/10055; B32B 17/10073; E06B 3/6621
(Continued)

(56) References Cited

U.S. PATENT DOCUMENTS

2004/0128924 A1 * 7/2004 Kobrehel ............... B60J 1/2094
52/203
2011/0271599 A1 * 11/2011 Xu ............................. B60J 1/14
49/394
(Continued)

FOREIGN PATENT DOCUMENTS

CN        202788522 U      3/2013
DE        3044451 A1 *     5/1982 ............. B62D 25/00
(Continued)

OTHER PUBLICATIONS

International Search Report as issued in International Patent Application No. PCT/FR2015/052491, dated Oct. 28, 2016.
Database WPI, Thomson Scientific, 2013, XP002743436, 1 page.

*Primary Examiner* — Jason S Morrow
(74) *Attorney, Agent, or Firm* — Pillsbury Winthrop Shaw Pittman LLP (57) ABSTRACT

A lateral glazing for a transport vehicle, particularly train glazing, the glazing being fixed multiple glazing, with an openable window, the glazing including at least one substrate intermediate face which includes, in a part of the glazing that is situated under said window, on the one hand, a main sheet of glass and, on the other hand, a main sheet of plastic which is situated in contact between the intermediate face and the main sheet of glass without the main sheet of glass and the main sheet of plastic being in contact with the glazing frame structure.

13 Claims, 3 Drawing Sheets

(51) Int. Cl.
*E06B 3/66* (2006.01)
*E06B 5/00* (2006.01)

(52) U.S. Cl.
CPC ...... *B32B 17/10091* (2013.01); *E06B 3/6621* (2013.01); *E06B 5/00* (2013.01); *B32B 2307/412* (2013.01)

(58) Field of Classification Search
USPC .............................. 296/201, 146.15, 146.16
See application file for complete search history.

(56) References Cited

U.S. PATENT DOCUMENTS

2018/0079181 A1* 3/2018 Gastal ............... B32B 17/10055
2018/0251139 A1* 9/2018 Gastal ........................ B60J 1/10

FOREIGN PATENT DOCUMENTS

| | | |
|---|---|---|
| DE | 101 19 315 C1 | 7/2002 |
| DE | 102 07 600 C1 | 4/2003 |
| EP | 1106407 | 6/2001 |
| EP | 1 527 920 A1 | 5/2005 |
| EP | 2 363 284 A1 | 9/2011 |
| FR | 2 708 927 A1 | 2/1995 |
| FR | 2 787 497 A3 | 6/2000 |

* cited by examiner

LATERAL GLAZING FOR MEANS OF TRANSPORT WITH OPENABLE WINDOW

CROSS-REFERENCE TO RELATED APPLICATIONS

This application is the U.S. National Stage of PCT/FR2015/052491, filed Sep. 17, 2015, which in turn claims priority to French patent application number 1458870 filed Sep. 19, 2014. The content of these applications are incorporated herein by reference in their entireties.

The invention relates to the production of lateral glazing for a means of transport, particularly train glazing, said glazing being fixed multiple glazing, with an openable window.

Such glazing usually comprises:
- an exterior substrate having an exterior face which faces an exterior space, an intermediate face on the opposite side from the exterior face, and a peripheral edge face,
- an interior substrate having an interior face which faces an interior space, an intermediate face on the opposite side from the interior face, and a peripheral edge face,
- and a glazing frame structure which holds the exterior substrate and the interior substrate together in such a way that the glazing separates said exterior space from said interior space with a glazing cavity situated between the exterior substrate and the interior substrate,
- said exterior substrate and said interior substrate each comprising, in an upper part, a hole opening onto each face of the substrate and separated from the peripheral edge face of the substrate, the holes in the substrates facing one another so as to allow the openable window to be created,
- the glazing frame structure further holding the two substrates around the holes.

The prior art is aware, from Chinese utility model No CN 202788522, of such fixed multiple lateral glazing with an openable window for a means of transport.

This glazing is satisfactorily attractive in appearance because of the substrates of which each is provided with a rectangular hole so that the openable window can be created.

This glazing has a satisfactory thermal insulation capacity because of the glazing cavity present between the two substrates.

However, this glazing is not what is termed "safety" glazing because the glass substrates, even if one or both has or have undergone a chemical or heat treatment intended to strengthen it or them, are unable to form safety glazing in the sense that if an object strikes one of the substrates and breaks it, that means that this object very probably has enough energy to be able to break the other substrate and thus completely break the glazing.

Only laminating, involving at least one sheet of plastic then a sheet of glass provided in that order on a surface of a substrate, makes it possible to create safety glazing. Such safety glazing is more impact resistant while at the same time allowing evacuation if need be after the glass substrates have been broken and the sheet of plastic cut.

Also known in the prior art, from European patent application No EP 2 363 284, is a lateral glazing structure for a means of transport, this glazing being fixed multiple safety glazing, but without an openable window. That document sets out a solution that makes it easier to break the glazing and thus evacuate more easily.

That document proposes that lamination reinforcing a substrate of the glazing not be in contact with a glazing frame peripheral structure and proposes that this lamination be set back from this peripheral structure. This setback is the same all around the periphery of the substrate: the distance between the edge face of the lamination and the edge face of the substrate bearing it is the same all along the periphery.

When this set-back lamination is applied to the teaching of document CN 202788522, logically this lamination needs to go all around the window structure. The setback logically follows the peripheral perimeter of the substrate bearing the lamination and is therefore present not only beneath the openable window, but also on the sides of this window and above it.

It is an object of the invention to make it possible to create fixed multiple glazing with an openable window that offers ease of destruction in a lower part situated beneath the openable window so as to allow emergency evacuation, while at the same time making it possible to preserve the glazing structure that holds the window so that this structure and this window do not hamper the emergency evacuation.

The invention thus relies on the fact of providing reinforcing lamination in the part of the glazing situated beneath the window, without this lamination being in contact with the glazing structure that holds the window.

The subject of the invention, in its broadest sense, is lateral glazing for a means of transport, particularly train glazing, as claimed in claim 1. Said glazing is fixed multiple glazing with an openable window comprising:
- an exterior substrate having an exterior face which faces an exterior space, an intermediate face on the opposite side from the exterior face, and a peripheral edge face,
- an interior substrate having an interior face which faces an interior space (I), an intermediate face on the opposite side from the interior face, and a peripheral edge face,
- and a glazing frame structure which holds the exterior substrate and the interior substrate together in such a way that the glazing separates said exterior space from said interior space with a glazing cavity situated between the exterior substrate and the interior substrate,
- said exterior substrate and said interior substrate each comprising, in an upper part, a hole opening onto each face of the substrate and separated from the peripheral edge face of the substrate, the holes in the substrates facing one another so as to allow the openable window to be created,
- the glazing frame structure further holding the two substrates around the holes.

The glazing according to the invention is notable in that at least one substrate intermediate face which faces the glazing cavity comprises, in a part of the glazing that is situated under said window, on the one hand, a main sheet of glass and, on the other hand, a main sheet of plastic which is situated in contact between the intermediate face and the main sheet of glass without the main sheet of glass and the main sheet of plastic being in contact with said glazing frame structure.

Thus, when the glazing is oriented vertically, the lamination comprising the main sheet of glass and the main sheet of plastic is positioned underneath the openable window; this lamination stops at the top some distance below a lower peripheral edge of the hole in the substrate that allows the creation of the window and on the sides and at the bottom at a distance from the peripheral edge face of the substrate that bears it so that when this lamination is broken to allow emergency evacuation, the destruction thereof has no influence on the integrity of the glazing all around, and quite particularly has no influence above, on the integrity of the window.

Because this main lamination is situated beneath the openable window, it does not extend on the left and right sides of the openable window, neither does it extend above the openable window (when the glazing is considered vertical).

The main lamination stops in its upper part below a horizontal line created by the lower edge of the hole in the substrate bearing the main lamination, this line being extended fictitiously over the substrate bearing the main lamination, to left and right of the hole.

It is therefore possible to break the glazing underneath the window so as to allow emergency evacuation underneath the window, keeping the window intact and the rest of the glazing intact, so that this window and the rest of the glazing do not hamper evacuation.

Said main sheet of glass and said main sheet of plastic are preferably set back by at least 2 mm and preferably by between 2 and 5 mm, from said glazing frame structure. This setback is preferably constant all around the main lamination. A setback value that falls within this range from 2 to 5 mm allows the lamination to reinforce the substrate bearing it as much as possible while at the same time being enough to make it possible to preserve the integrity of the glazing structure and also makes it possible for this setback not to be very visible from the interior, maintaining the greatest possible clear view through the lamination.

In order to improve the ability to maintain the integrity of the glazing structure while at the same time allowing a passage through underneath the window in the event of breakage, preferably at least one substrate intermediate face which faces the glazing cavity, and more preferably both substrate intermediate faces that face the glazing cavity comprises (comprise), in a part of the glazing that is situated above said window, on the one hand, a secondary sheet of glass and, on the other hand, a secondary sheet of plastic which is situated in contact between the intermediate face and the secondary sheet of glass, with the secondary sheet of glass and the secondary sheet of plastic in contact with said glazing frame structure.

Thus the glazing is strengthened in its part above the window. However, this secondary lamination comprising the secondary sheet of glass and the secondary sheet of plastic, while situated on the same substrate as the main lamination, is separate from the main lamination: the secondary lamination is separated from the main lamination by a non-laminated strip of substrate; this strip for example has a height of the order of 5 to 50 millimeters.

For preference, said secondary sheet of plastic and said secondary sheet of glass are also situated on each lateral side of said window. Thus, the glazing is strengthened also in the two lateral parts thereof, on each side of the window.

In an alternative form that is easier to manufacture, said main sheet of plastic and said secondary sheet of plastic are both situated against the intermediate face of one and the same substrate, and preferably of the exterior substrate. For preference, in order not to create a direct mechanical or chemical bond between them, these two sheets of plastic are not in contact with one another.

For preference, each substrate is made of glass that has undergone a chemical or heat treatment intended to strengthen it.

In one particular embodiment of the invention, said window comprises an exterior glassworks element, an interior glassworks element and a window frame structure holding said exterior glassworks element with said interior glassworks element while creating a window cavity situated between the exterior glassworks element and the interior glassworks element, a face of the exterior glassworks element that faces the window cavity comprising, on the one hand, a sheet of window glass and, on the other hand, a sheet of window plastic which is situated in contact between the exterior glassworks element and the sheet of window glass, with the sheet of window glass and the sheet of window plastic in contact with said window frame structure. This contact with the window frame structure makes it possible to increase the mechanical strength of the window.

The "window frame" denotes the perimeter of the openable window that can move with the window when the window is opened or closed.

Said glazing frame structure preferably comprises a horizontal crossmember situated beneath said window, said crossmember not being in contact with two lateral frame members of the glazing frame structure.

Said glazing cavity is preferably situated all around said window (this glazing cavity is in one piece).

The glazing according to the invention preferably has no element protruding outward beyond the exterior face of the exterior substrate.

Each sheet of plastic used for the glazing according to the invention has the ability to enhance the mechanical strength by causing the sheet of glass positioned above to adhere to the substrate or to the glassworks element positioned below; in this glazing, at least one of these sheets of plastic, or even all these sheets of plastic, may further have acoustic insulation properties.

Advantageously, the present invention thus makes it possible to create fixed multiple glazing for a means of transport which has superior heat insulation properties, superior mechanical integrity properties while at the same time having a window that is openable, and which can be used as an emergency exit.

The present invention in particular allows the space of the glazing which is situated beneath the openable window to be used as an emergency exit while keeping the rest of the glazing intact, which means to say while allowing the window structure to remain in place so as not to hamper the evacuation, underneath, through the emergency exit thus created.

Advantageously, the present invention thus makes it possible to create fixed multiple glazing with an openable window that has a smooth exterior appearance, with no mechanical element further toward the outside than the exterior face of the exterior substrate.

The details and advantageous features of the invention will become apparent from the following non-limiting example illustrated with the support of the attached figures which illustrate:

In FIGS. 1 to 4, the various elements have been drawn true to scale in order to make the figures easier to understand; throughout all the figures, the same references denote the same elements.

Figure 1:
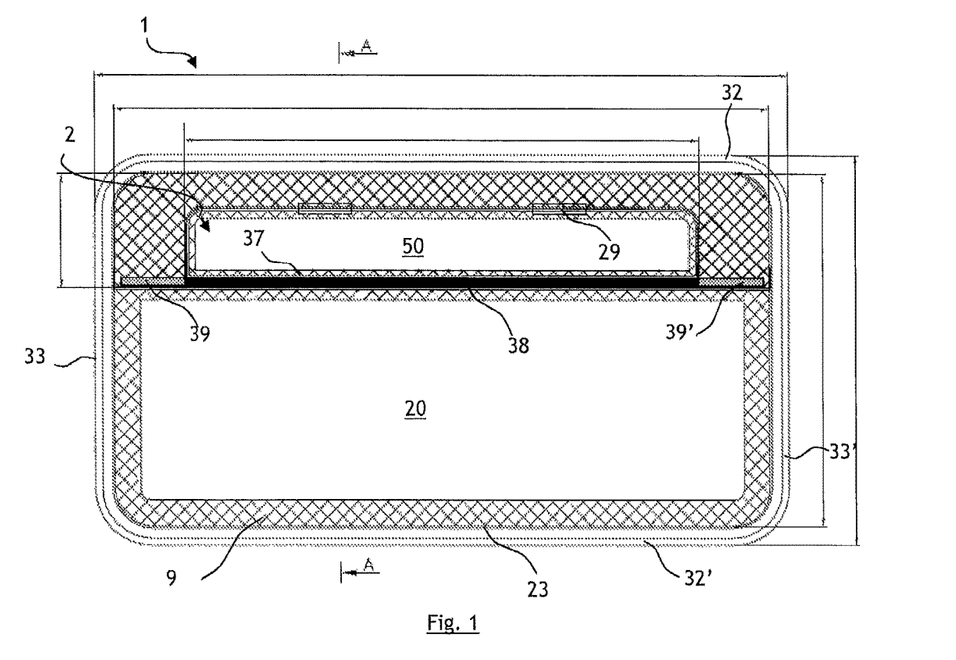
in FIG. 1, glazing according to the invention, viewed from the interior space.
Figure 4:
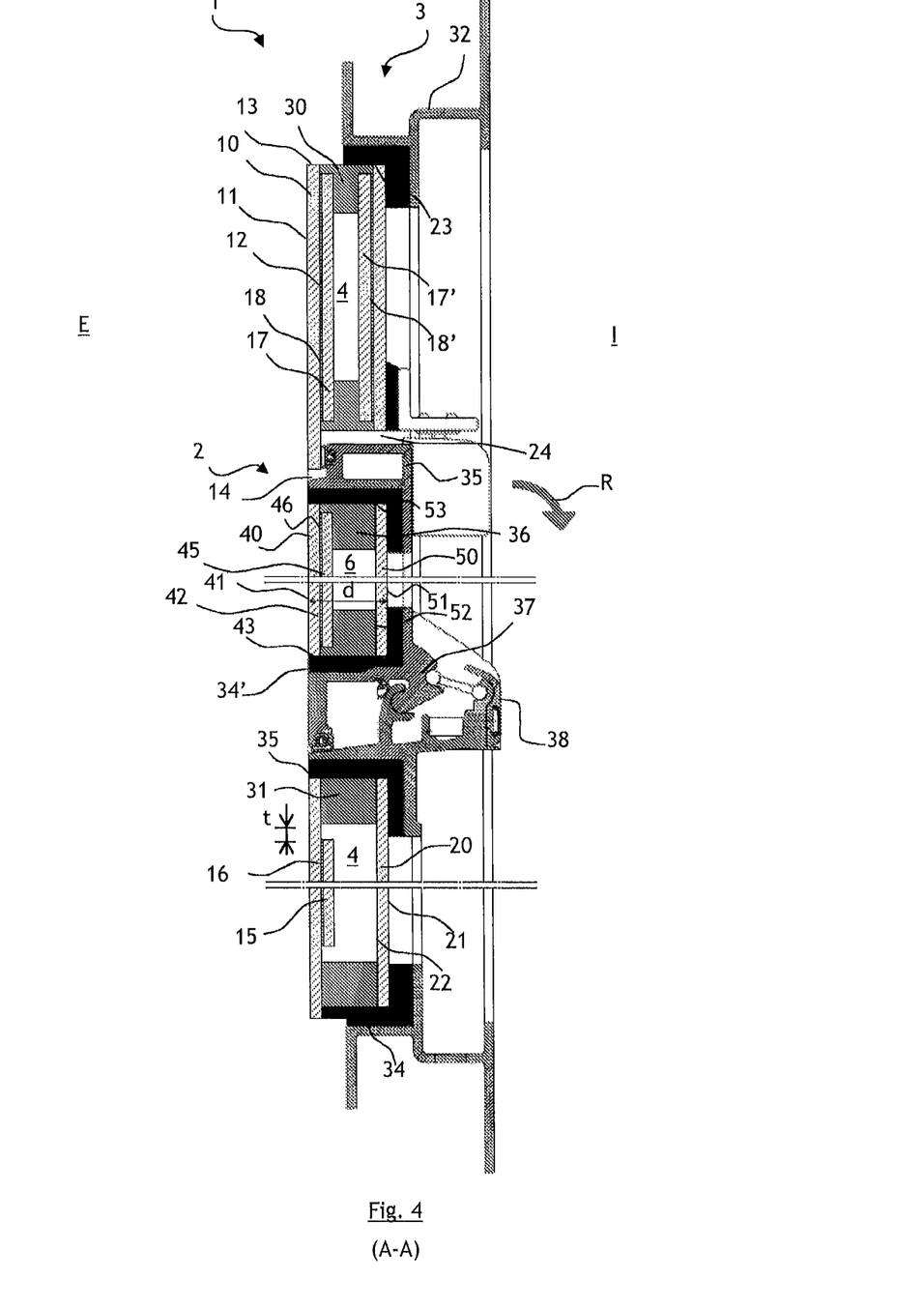

FIGS. 1 and 4 illustrate lateral glazing 1 for a means of transport according to the invention, as may be seen by a passenger situated inside this means of transport.

It is in particular lateral glazing for a train and FIG. 1 thus illustrates what a passenger of the train sees when looking out of a left or right side with reference to the overall direction in which the train is traveling.

This glazing thus provides a vertical separation between an interior space I inside the train and an exterior space E outside the train.

This glazing is fixed and has an openable window 2.

This glazing 1 comprises:
- an exterior substrate 10 which comprises two main faces:
  an exterior face 11 that faces the exterior space E and an intermediate face 12 which is on the opposite side from the exterior face; this substrate moreover comprises a peripheral edge face 13,
- an interior substrate 20 which comprises two main faces:
  an interior face 21 which faces the interior space I and an intermediate face 22 which is on the opposite side from the interior face; this substrate moreover comprises a peripheral edge face 23,
- and a glazing frame structure 3 that holds the exterior substrate 10 and the interior substrate 20 fixedly together; although a closed space is situated between the two substrates: this being a glazing cavity 4.

The exterior substrate 10 and the interior substrate 20 are each made in one piece and each comprise, in an upper part (with reference to the vertical), a hole 14, 24, each hole opening onto each face of each substrate and being separated from the peripheral edge face of the substrate, the holes in the substrates facing one another so as to allow the openable window 2 to be created, which means to say so as to allow the fixed periphery of the openable window to be created.

The glazing frame structure 3 also holds the two substrates around the holes 14, 24.

The glazing frame structure 3 thus allows the two substrates 10, 20 to be kept at a distance from one another, even around the openable window, with a constant distance between the two substrates 10, 20.

The glazing 1 is multiple glazing in so far as it comprises several substrates 10, 20 and the glazing cavity 4 which is situated between the two substrates, this cavity being filled with air or with gas, preferably a neutral gas such as argon; this cavity contributes to the thermal insulation afforded by the glazing 1.

This glazing 1 is fixed glazing in so far as the glazing frame structure 3 is intended to be fixed to the structure of the means of transport (in this instance the train) without the possibility of moving relative to this structure; in the glazing 1, only the window 2 is able to move with respect to the glazing frame structure 3.

The window 2 is a window internal to the glazing 1; it is openable in so far as it can be opened and closed again relative to the glazing frame structure 3, which is fixed. Of course means are provided for guiding these opening and closing movements, and for limiting same. For safety reasons, the window 2 can be opened toward the interior space and not toward the exterior space.

In the context of the invention, at least an intermediate face 12, 22 of one of the substrates 10, 20 which faces the glazing cavity 4 comprises, in a part of the glazing which is situated beneath said window:
- on the one hand, a main sheet of glass 15,
- and on the other hand, a main sheet of plastic 16,
- with this main sheet of plastic 16 being situated between the intermediate face 12, 22 and the main sheet of glass 15,
- this main sheet of plastic 16 being in contact both with the intermediate face 12, 22 and with the main sheet of glass 15,
- without the main sheet of glass 15 and the main sheet of plastic 16 being in contact with said glazing frame structure 3.

Thus, the glazing 1 comprises at least one of its substrates which is laminated, but this lamination is highly specific because the sheet of plastic then the sheet of glass which are added in this order to the intermediate face of the substrate have a periphery that is shrunk back from the periphery of the substrate so that neither the one nor the other is in contact with the glazing frame structure 3.

Figure 2:
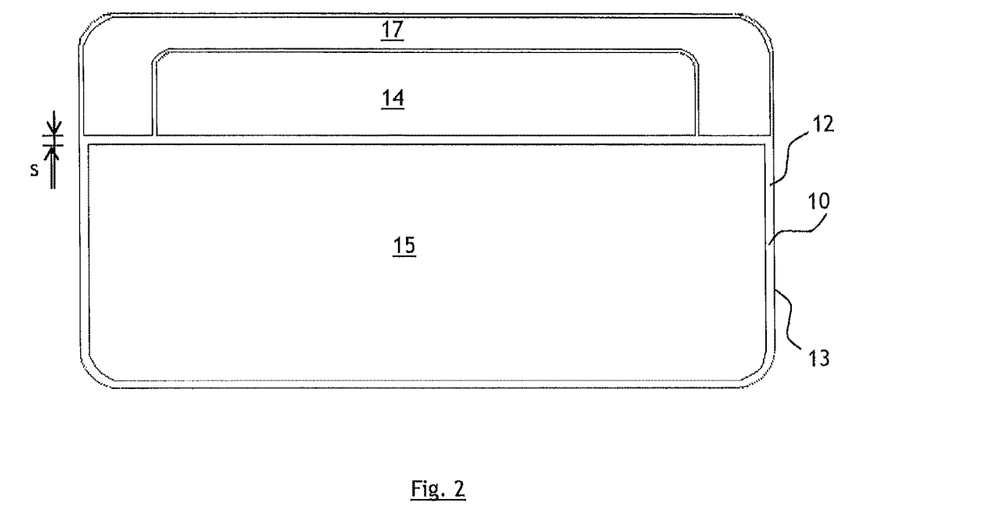
in FIG. 2, the exterior substrate of the glazing of FIG. 1, viewed from the glazing cavity and toward the exterior.

This characteristic feature can be seen more specifically in FIG. 2 that illustrates the fact that the lamination created by the main sheet of glass 15 which is bonded to the intermediate surface 12 by the main plastic 16 stops at the top at a distance s from the lower edge of the hole 14 and also stops at a distance, which is preferably the same, from the peripheral edge face 13; this distance s is at least 5 mm and preferably at least 7 mm; it may for example be 6 mm or 8 mm.

This characteristic feature is important in conferring upon the glazing its safety glazing quality while at the same time making it possible to preserve the structure of the openable window; if the sheet of plastic and the sheet of glass which are added to the intermediate face of the substrate extended as far as the peripheral edge face 13 of the substrate and as far as the lower edge of the hole 14 or along the sides of the openable window then these sheets would be in contact with the glazing frame structure 3 and the effort required to break the glazing beneath the window in an emergency would carry with it the risk of damaging the window frame structure.

Now, if this structure becomes damaged, there is the risk that it will hamper the evacuation; it is a key objective of the invention to avoid that.

In the embodiment detailed here, it is the intermediate face 12 of the exterior substrate 10 that comprises, in a part of the glazing that is situated beneath said window, the main sheet of plastic 16, then, on this main sheet of plastic, the main sheet of glass 15, although it could be the intermediate face 22 of the interior substrate 20 that comprises, in a part of the glazing situated beneath said window the main sheet of plastic, then, on this main sheet of plastic, the main sheet of glass.

A main lamination is thus created which comprises said main sheet of plastic 16 and said main sheet of glass 15.

In absolute terms, it is possible for the intermediate face 12, 22 of each of the two substrates 10, 20 that faces the glazing cavity 4 each to comprise, in a part of the glazing that is situated beneath said window:
- on the one hand, a main sheet of glass
- and, on the other hand, a main sheet of plastic,
- with this main sheet of plastic being situated between the intermediate face and the sheet of glass,
- this main sheet of plastic being in contact both with the intermediate face and with the sheet of glass,
- without the sheets of glass and the sheets of plastic being in contact with said glazing frame structure.

As visible more particularly in FIG. 4, the glazing frame structure 3 comprises two spacer pieces:
- a peripheral spacer piece 30 (or "spacer") which is situated all around the periphery of the two substrates 10, 20, namely that follows the peripheral edge face 13, 23 of these two substrates, and an internal spacer piece 31 (or "spacer") which is situated all around the periphery of the two holes 14, 24.

Each of these two spacer pieces is preferably made as one piece. They are not in contact with one another.

Each of these two spacer pieces is in this instance positioned against the intermediate faces 12, 22 of the substrates, without being in contact with the peripheral edge faces 13, 23 of the substrates.

The spacer pieces may for example be made of plastic and/or metal and/or metal alloy; they allow the two substrates 10, 20 to be kept a constant distance apart and create the glazing cavity 4.

With regard to the height of the spacer pieces (when observed vertically) the distance s mentioned hereinabove means that the main sheet of glass 15 and the main sheet of plastic 16 have a setback t of at least 2 mm, and preferably at least 5 mm, with respect to said glazing frame structure 3, namely with respect to the internal spacer piece 31 at the top of this lamination and with respect to the peripheral spacer piece 30 on the lateral sides and at the bottom of this lamination.

The glazing frame structure 3 moreover comprises top 32 and bottom 32' horizontal frame members and left 33 and right 33' lateral frame members (as viewed from the inside as in FIG. 1). These frame members are preferably made of metal or metal alloy.

This FIG. 1 also shows a masking layer 9, situated on the interior face 21 of the interior substrate (and not illustrated in FIG. 4). This masking layer conceals the periphery of this interior face 21, and the periphery of the openable window 2; this masking layer also conceals everything which, in the direction of the outside, is behind the periphery of the interior face 21 and the periphery of the openable window 2.

The glazing frame structure 3 also comprises a peripheral bead of adhesive 34 that allows the peripheral edge faces 13, 23 of the substrates and the peripheral spacer piece 30 to be bonded to the frame members 32, 32', 33, 33'. This bead of adhesive may for example be based on polyurethane or silicone or MS polymer or polysulfide.

The frame members 32; 32', 33 and 33' are optional because it is possible for the glazing to be bonded into the opening without the use of frame members or by using only lateral frame members or horizontal frame members.

As visible in FIGS. 2 and 4, the intermediate face 12 of the exterior substrate comprises, in a part of the glazing situated above said window 2 (and, more specifically in this figure, above the hole 14 that accommodates the window 2), on the one hand, a secondary sheet of glass 17 and, on the other hand, a secondary sheet of plastic 18 which is interposed, in contact, between the intermediate face 12 and the secondary sheet of glass 17.

The secondary sheet of plastic 18 and the secondary sheet of glass 17 are also situated on each lateral side of said window (and, more specifically in this figure, on each lateral side of the hole 14 that accommodates the window 2).

Thus, the secondary lamination using the secondary sheet of plastic 18 and the secondary sheet of glass 17 frames the hole 14 at the top and on the left and right sides thereof, being in the shape of an inverted U; this lamination does not extend beneath the hole 14 because it is another lamination that is present underneath this hole: the main lamination with the main sheet of plastic 16 and the main sheet of glass 15.

For good mechanical integrity of the secondary lamination above the window and on the sides thereof, the secondary sheet of glass 17 and the secondary sheet of plastic 18 are preferably in contact with said glazing frame structure 3 and, more particularly here, near the peripheral edge face 13 in contact with the peripheral spacer piece 30 and near the hole 14 in contact with the internal spacer piece 31. That enhances the ability of the glazing to remain intact when the glazing is broken underneath the openable window (when the emergency exit is being put to use).

The secondary sheet of glass 17 preferably has the same thickness as the main sheet of glass 15 and the secondary sheet of plastic 18 preferably has the same thickness as the main sheet of plastic 16; however, these sheets of glass and sheets of plastic do not overlap; the secondary lamination is separated from the main lamination by the distance s, which creates a separation strip with a height of at least 2 mm and preferably of between 5 and 10 mm.

With reference to FIG. 2, any reader may note that the direct teaching of European patent application No EP 2 363 284 mentioned hereinabove would lead to the creation of a single lamination on the bearing substrate, that would, in one single same lamination, incorporate both the main sheet of plastic and the secondary sheet of plastic into a single sheet of plastic and incorporate the main sheet of glass and the secondary sheet of glass into a single sheet of glass. There would therefore not be the distance s that can be seen in FIG. 2.

Figure 3:
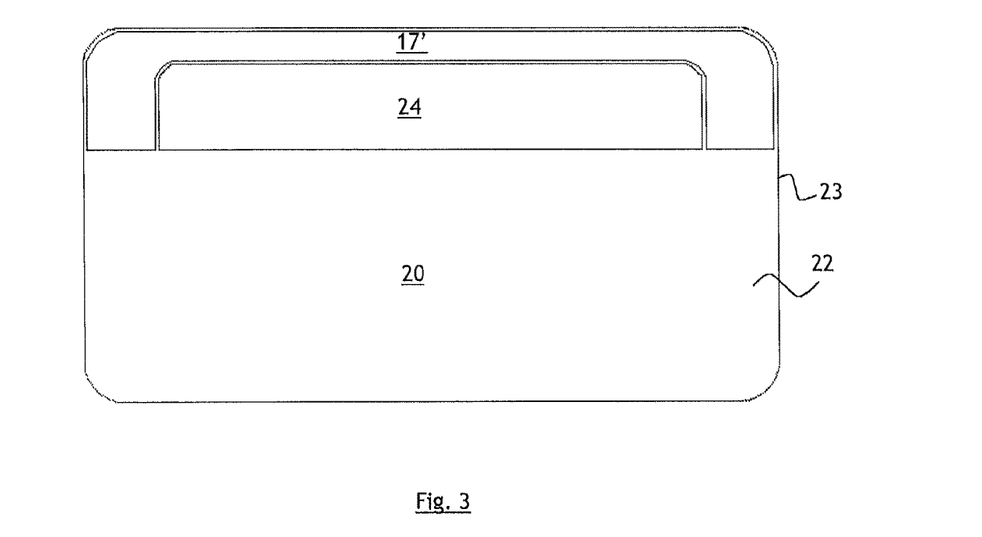
in FIG. 3, the interior substrate of the glazing of FIG. 1, viewed from the glazing cavity and toward the interior; and in FIG. 4, the glazing of FIG. 1 viewed in section on AA of that figure.

As visible in FIGS. 3 and 4, the intermediate face 22 of the interior substrate comprises, in a part of the glazing that is situated above said window 2 (and, more specifically in this figure, above the hole 24 that accommodates the window 2), on the one hand, a secondary sheet of glass 17' and, on the other hand, a secondary sheet of plastic 18' which is interposed, in contact, between the intermediate face 22 and the secondary sheet of glass 17'.

The secondary sheet of plastic 18' and the secondary sheet of glass 17' are also situated on each lateral side of said window (and more specifically in this figure on each lateral side of the hole 24 that accommodates the window 2).

For this lamination to have good mechanical integrity, the secondary sheet of glass 17' and the secondary sheet of plastic 18' are preferably in contact with said glazing frame structure 3 and, more particularly here, near the peripheral edge face 23 in contact with the peripheral spacer piece 30 and near the hole 24 in contact with the internal spacer piece 31. That enhances the ability of the glazing to remain intact when the glazing is broken underneath the openable window (when the emergency exit is being put to use).

It has been checked that adequate mechanical integrity is obtained on the basis of the examples of FIGS. 1 to 4 when:

the two substrates 10, 20 are each made of glass that has undergone a treatment intended to strengthen it, such as a heat treatment and, in particular, a tempering heat treatment, and are each 3 to 6 mm, for example 4 mm, thick the main sheet of glass 15 and the two secondary sheets of glass 17, 17' are, all three of them, made of glass that has undergone no treatment intended to strengthen it and are each 2 mm thick the main sheet of plastic 16 and the two secondary sheets of plastic 18, 18' are, all three of them, made of PVB and are each 0.76 mm thick.

The main sheet of glass 15 and the two secondary sheets of glass 17, 17' may potentially be made of glass that has undergone a treatment intended to strengthen them, such as a heat treatment and, in particular, a tempering heat treatment.

It has been checked that adequate thermal insulation is achieved on the basis of the example of FIGS. 1 to 4 when said glazing cavity 4 is situated all around said window 2, of one piece, filled with argon and has, on the one hand, a thickness that is uniform and identical to the preceding one in the part thereof beneath the window 2 and, on the other hand, a thickness that is uniform in the part thereof on each side of and above the window 2.

The distance between the exterior face 11 and the interior face 21 is thus constant and in this instance 25.76 mm.

As visible in FIG. 4, the window 2 comprises an exterior glassworks element 40, an interior glassworks element 50 and a window frame structure 35 that holds the exterior glassworks element 40 with the interior glassworks element 50 while creating a window cavity 6 which is thus situated between the exterior glassworks element 40 and the interior glassworks element 50:
- the exterior glassworks element 40 comprises two main faces: an exterior face 41 that faces the exterior space E and an intermediate face 42 which is on the opposite side from the exterior face; the exterior glassworks element 40 moreover comprises a peripheral edge face 43,
- the interior glassworks element 50 comprises two main faces: an interior face 51 that faces the interior space I and an intermediate face 52 which is on the opposite side from the interior face; the interior glassworks element 50 moreover comprises a peripheral edge face 53.

As visible more particularly in FIG. 4, the window frame structure 35 comprises a peripheral window spacer piece 36 ("or spacer") which is situated all around the periphery of the two glassworks elements 40, 50.

This peripheral window spacer piece 36 is preferably made in one piece and is here positioned against the intermediate faces 42, 52 of the glassworks elements without being in contact with the peripheral edge faces 43, 53 of these glassworks elements.

This spacer piece may for example be made of plastic and/or of metal and/or of metal alloy and allows the two glassworks elements 40, 50 to be kept a constant distance apart and create the window cavity 6.

The window frame structure 35 moreover comprises top and bottom horizontal frame members and left and right lateral frame members. These frame members are preferably made of metal or metal alloy.

The window frame structure 35 further comprises a peripheral bead of adhesive 34' that allows the peripheral edge faces 43, 53 of the glassworks elements and the peripheral window spacer piece 36 to be bonded to the frame members. This bead of adhesive 34' is preferably made of the same substance as the peripheral bead of adhesive 34.

The face 42 of the exterior glassworks element that faces the window cavity 6 comprises:
- on the one hand, a sheet of window glass 45,
- and, on the other hand, a sheet of window plastic 46,
- with this sheet of window plastic 46 being situated between the intermediate face 42 and the sheet of window glass 45,
- this sheet of window plastic 46 being in contact both with the intermediate face 42 and with the sheet of window glass 45,
- with the sheet of window glass 45 and the sheet of window plastic 46 in contact with the window frame structure 35 (and, more specifically here, the peripheral bead of adhesive 34').

The two glassworks elements 40, 50 are each made of glass which has undergone a treatment intended to strengthen it, such as a heat treatment and, in particular, a tempering heat treatment, and are each of a thickness respectively identical to the substrates 10, 20.

The sheet of window glass 45 has the same thickness as the main sheet of glass 15 and the sheet of window plastic 46 has the same thickness as the main sheet of plastic 16.

The distance d between the exterior face 41 and the interior face 51 is thus constant and equal to 25.76 mm here; it is identical to the distance between the exterior face 11 and the interior face 21.

The window 2 is able to move with respect to the glazing frame structure 3 in a rotational movement illustrated by the double ended arrow R in FIG. 4, toward the inside; this movement is limited to an angle of opening of around 45°.

To allow this opening, the glazing frame structure 3 comprises a horizontal crossmember 38 situated beneath said window 2 that allows the bottom horizontal frame member 37 of the window frame to pivot on itself about a horizontal axis and with respect to the horizontal crossmember 38.

Two handles 29 are provided on the upper frame member of the window frame structure 35 to make it easier for passengers wishing to open or close the window 2 to grasp same.

The crossmember 38 is also preferably made of metal or metal alloy and is bonded to the interior face 21 of the interior substrate 20 using the bead of adhesive that surrounds the holes 14, 24.

This crossmember 38 is not in contact with two lateral frame members 33, 33' of the glazing frame structure 3.

However, in order to conceal the absence of lamination to the left and right of the crossmember 38 over a few millimeters, lateral masks 39, 39' are bonded to the interior face 21 as may be seen in FIG. 1. A decorative pattern applied for example by screen printing to the intermediate faces 12 and 22 may also perform this esthetic function.

As visible in FIG. 4, the glazing 1 according to the invention has no element protruding outward beyond the exterior face 11 of the exterior substrate 10.

The present invention has been described in the forgoing by way of example. Of course a person skilled in the art is competent to realize alternative forms of the invention without thereby departing from the scope of the patent as defined by the claims.

The invention claimed is:

1. A lateral glazing for a transport vehicle, said glazing being a fixed multiple glazing, with an openable window, said glazing comprising:
   - an exterior substrate having an exterior face which faces an exterior space, an intermediate face on the opposite side from the exterior face, and a peripheral edge face,
   - an interior substrate having an interior face which faces an interior space, an intermediate face on the opposite side from the interior face, and a peripheral edge face,
   - a glazing frame structure which holds the exterior substrate and the interior substrate together in such a way that the glazing separates said exterior space from said interior space with a glazing cavity situated between the exterior substrate and the interior substrate,
   - said exterior substrate and said interior substrate each comprising, in an upper part, a hole opening onto each face of the substrate and separated from the peripheral edge face of the substrate, the holes in the exterior and interior substrates facing one another so as to allow the openable window to be created, the glazing frame structure further holding the exterior and interior substrates around the holes, wherein at least one substrate intermediate face which faces the glazing cavity comprises, in a part of the glazing that is situated under said window, on the one hand, a main sheet of glass and, on the other hand, a main sheet of plastic which is situated in contact between the intermediate face and the main sheet of glass without the main sheet of glass and the main sheet of plastic being in contact with said glazing frame structure.

2. The glazing as claimed in claim 1, wherein said main sheet of glass and said main sheet of plastic are set back by at least 2 mm from said glazing frame structure.

3. The glazing as claimed in claim 1, wherein at least one substrate intermediate face which faces the glazing cavity, comprises, in a part of the glazing that is situated above said window, on the one hand, a secondary sheet of glass and, on the other hand, a secondary sheet of plastic which is situated in contact between the intermediate face and the secondary sheet of glass, with the secondary sheet of glass and the secondary sheet of plastic in contact with a peripheral spacer piece of said glazing frame structure.

4. The glazing as claimed in claim 3, wherein said secondary sheet of plastic and said secondary sheet of glass are also situated on each lateral side of said window.

5. The glazing as claimed in claim 3, wherein said main sheet of plastic and said secondary sheet of plastic are both situated against the intermediate face of the exterior substrate.

6. The glazing as claimed in claim 1, wherein each substrate is made of glass that has undergone a chemical or heat treatment intended to strengthen it.

7. The glazing as claimed in claim 1, wherein said window comprises an exterior glassworks element, an interior glassworks element and a window frame structure holding said exterior glassworks element with said interior glassworks element while creating a window cavity situated between the exterior glassworks element and the interior glassworks element, a face of the exterior glassworks element that faces the window cavity comprising, on the one hand, a sheet of window glass and, on the other hand, a sheet of window plastic which is situated in contact between the exterior glassworks element and the sheet of window glass, with the sheet of window glass and the sheet of window plastic in contact with a window spacer piece of said window frame structure.

8. The glazing as claimed in claim 1, wherein said glazing frame structure comprises a horizontal crossmember situated beneath said window, said crossmember not being in contact with two lateral frame members of the glazing frame structure.

9. The glazing as claimed in claim 1, wherein said glazing cavity is situated all around said window.

10. The glazing as claimed in claim 1, wherein the glazing has no element protruding outward beyond the exterior face of the exterior substrate.

11. The glazing as claimed in claim 1, wherein the lateral glazing is a train glazing.

12. The glazing as claimed in claim 2, wherein said main sheet of glass and said main sheet of plastic are set back between 2 and 5 mm from said glazing frame structure.

13. The glazing as claimed in claim 1, wherein both substrate intermediate faces that face the glazing cavity comprise, in a part of the glazing that is situated above said window, on the one hand, a secondary sheet of glass and, on the other hand, a secondary sheet of plastic which is situated in contact between the intermediate face and the secondary sheet of glass, with the secondary sheet of glass and the secondary sheet of plastic in contact with a peripheral spacer piece of said glazing frame structure.

\* \* \* \* \*